United States Patent

[11] 3,577,081

[72] Inventor Hansrichard Schulz
Villingen, Black Forest, Germany
[21] Appl. No. 740,238
[22] Filed June 26, 1968
[45] Patented May 4, 1971
[73] Assignee Saba Schwarzwalder Apparate-Bau-Anstalt
August Schwer Sohne GmbH
Villingen, Schwarzwald, Germany

[54] METHOD AND ARRANGEMENT FOR SYNCHRONIZATION OF THE SUPPLEMENTARY CARRIER FREQUENCY OSCILLATOR
6 Claims, 4 Drawing Figs.

[52] U.S. Cl. .......... 325/329, 325/422, 332/44
[51] Int. Cl. .......... H04b 1/68
[50] Field of Search .......... 325/329, 330, 331, 49, 50, 138, 419, 421, 422; 332/44

[56] References Cited

UNITED STATES PATENTS 2,938,114 5/1960 Krause .......... 325/329
2,999,154 9/1961 Krause .......... 325/329
3,286,183 11/1966 Bergemann .......... 325/329

*Primary Examiner*—Robert L. Griffin
*Assistant Examiner*—R. S. Bell
*Attorney*—Michael S. Striker

ABSTRACT: A suppressed carrier single sideband signal is received, converted to an intermediate frequency, and fed to a preferably square law detector for generating a reference signal derived from the difference in frequency between a harmonic and the fundamental of the modulation frequency, or between two harmonics of the modulation frequency. The intermediate frequency signal is also fed to a mixer where it is combined with the supplementary carrier frequency oscillator signal thus generating a low frequency signal whose exact frequency depends both on the modulation signal frequency and any difference in frequency between the transmitter carrier frequency and the receiver supplementary carrier frequency. The reference signal and low frequency signal are compared in a phase discriminator yielding an error signal which is applied to a reactance stage which in turn serves to change the frequency of the supplementary carrier frequency oscillator in the receiver.

PATENTED MAY 4 1971 3,577,081

SHEET 1 OF 2

Inventor:
HANSRICHARD SCHULZ

By: Michael S. Striker
Attorney

Inventor:
HANS RICHARD SCHULZ
By: Michael S. Striker
Attorney

METHOD AND ARRANGEMENT FOR SYNCHRONIZATION OF THE SUPPLEMENTARY CARRIER FREQUENCY OSCILLATOR

BACKGROUND OF THE INVENTION

This invention relates to a method and arrangement for synchronizing the supplementary carrier frequency oscillator in a receiver to the corresponding carrier frequency oscillator in the transmitter.

The method and arrangement may be used upon reception of either a single sideband signal or a signal having both sidebands, and may also be used for a signal with a carrier or one with a suppressed carrier. However it is particularly applicable for single sideband signals with a suppressed carrier.

When a suppressed carrier signal having both sidebands is received, it is possible to synchronize the supplementary carrier frequency oscillator in the receiver by means of the mirror image of the second sideband in such a manner that the carrier frequency at the receiver always coincides with that in the transmitter, resulting in a demodulation which is accurate with respect to frequency.

When using conventional methods, reception of a single sideband signal can result in automatic and exact synchronization only if at least a residual carrier is transmitted simultaneously.

If however this residual carrier signal is missing, the only remaining alternative is to tune a frequency stable supplementary carrier frequency oscillator manually to achieve the best possible audio output. However, resulting from the inexactness of a manual tuning and also from temperature changes in the oscillator, generally a frequency error of approximately 10 to 20 Hz. must be tolerated which in turn results in a decrease of intelligibility of the spoken word.

SUMMARY OF THE INVENTION

This invention comprises a method and arrangement for synchronizing a supplementary carrier frequency oscillator in a receiver with a corresponding transmitter carrier frequency oscillator used during the generation of a transmission signal comprising at least a single sideband of said carrier frequency with a modulation signal having a fundamental frequency and harmonics of said fundamental frequency. Said transmission signal is received at said receiver, demodulated in such a manner that at least one reference signal having a frequency corresponding to the difference in frequency between at least one pair of frequencies in said modulation signal is generated. Further the received signal is mixed with said receiver generated supplementary carrier frequency signal; thus furnishing a low frequency signal whose frequency depends upon both said modulation signal frequencies and any difference in frequency between said transmitter carrier frequency and said receiver supplementary carrier frequency. Said reference signal and said low frequency signal are compared and an error signal is generated as a function of any difference between their respective frequencies. The frequency of said receiver supplementary carrier frequency oscillator is then changed as a function of said error signal.

It will be noted that in this method the momentary basic modulation frequency and its harmonics are used to derive the exact carrier frequency, that is to synchronize the supplementary carrier frequency oscillator. The method and arrangement of this invention are based on the fact that the harmonics of the modulation frequency result in high frequency sideband oscillations after modulation in the transmitter, and that the frequency difference of these sideband oscillations with respect to the carrier frequency constitute integral multiples of the associated frequency of the basic modulation signal. In particular, use is made of the fact that the frequency difference between two adjacent sideband frequencies corresponding to said harmonics is always equal to the frequency difference between the sideband frequency corresponding to the basic modulation frequency and the carrier frequency.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
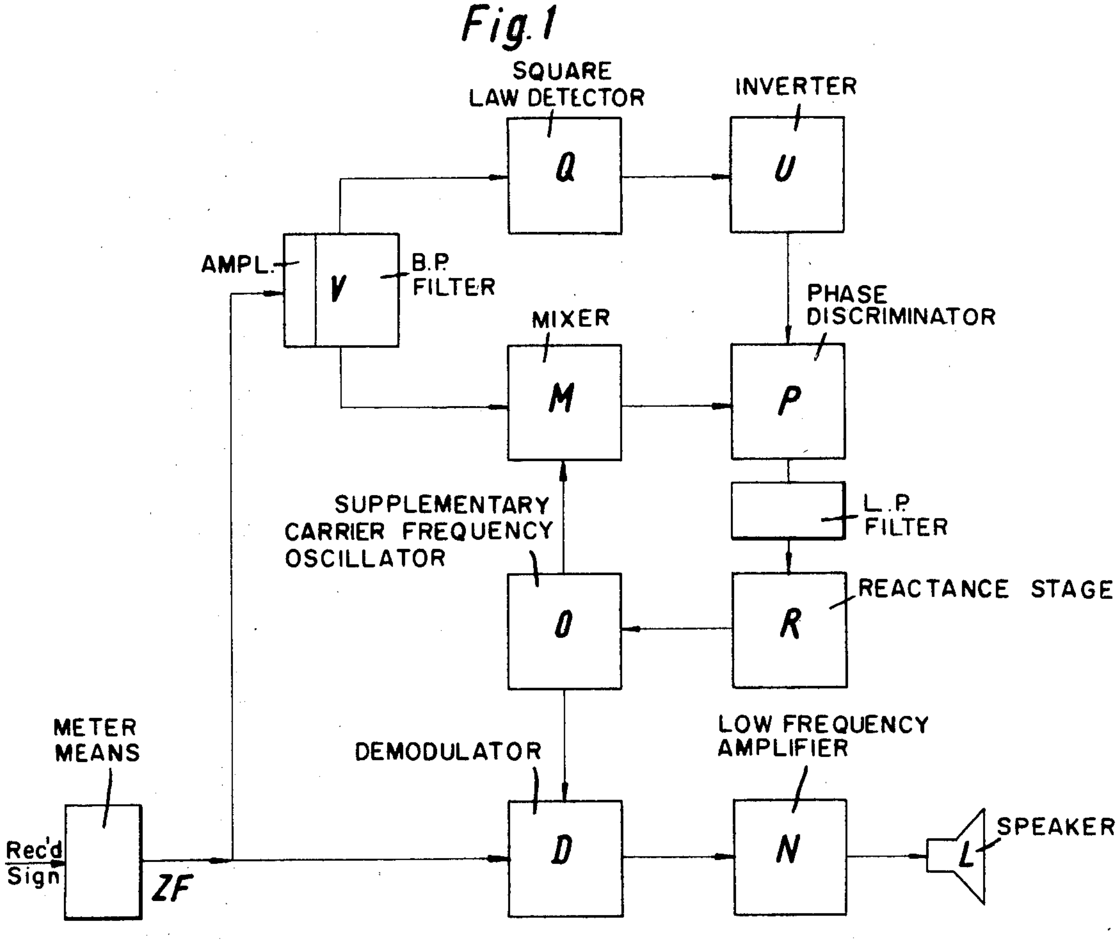
FIG. 1 is a block diagram of a receiver incorporating the present invention.

The receiver which is shown in schematic form in FIG. 1 is suitable for the reception of single sideband modulated signals with a suppressed carrier. The received signal is heterodyned in the conventional fashion yielding an intermediate frequency signal and then amplified by an intermediate frequency amplifier, yielding the signal as indicated as ZF under FIG. Demodulation of this intermediate frequency signal takes place in demodulator D. This is followed by amplification in a low frequency amplifier N, whose output is connected to the speaker L.

An additional input to the demodulator D is the supplementary carrier frequency signal furnished by supplementary carrier frequency oscillator O. The method and system for synchronizing this supplementary carrier frequency oscillator O in the receiver with the corresponding carrier frequency oscillator in the transmitter is the subject of the present invention.

The intermediate frequency sideband is also applied to the isolation amplifier V which is part of the control arrangement of this invention. It will be assumed that reproduction of speech only is required and that therefore a low frequency region of between 300 to 3800 Hz is required. If an intermediate frequency carrier frequency of 30.0 kHz. is assumed the intermediate frequency modulation spectrum must extend from 30.3 to 33.8 kHz.

The output of the isolation amplifier V is supplied both to the demodulator Q and to the mixing means M. It is useful to connect a band pass filter to the output of the isolation amplifier V, said band pass filter having a transmission region corresponding to the preferred intermediate frequency region which corresponds to the region around 30.6 kHz. in the present example. This results in the highest amplification applied to the sideband oscillations corresponding to the two lower harmonics of the modulation signal.

The supplementary carrier frequency signal furnished by the oscillator O is heterodyned with the intermediate frequency sideband oscillations in the mixing stage M. At the output of this mixing stage there thus appears a low frequency signal whose frequency deviates from the modulation frequency of the transmitted signal by the difference in frequency between the transmitter and the receiver supplementary carrier frequency oscillators.

Figure 2A:
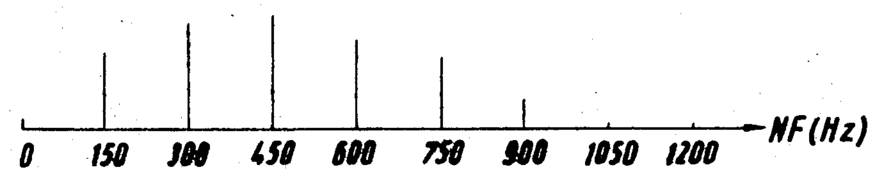
FIG 2*a* is the frequency spectrum of the vowel U for a basic modulation frequency of the vocal chords of 150 Hz.
Figure 2B:
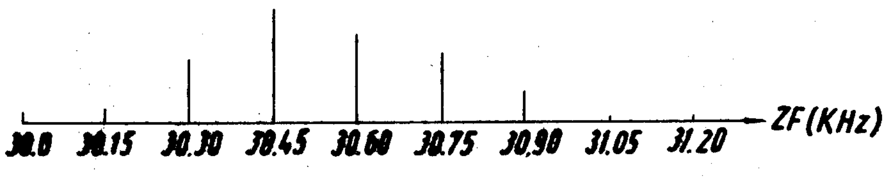
FIG. 2*b* is the frequency spectrum after modulation with a modulation signal as shown in FIG. 2*a*, and after transformation to the intermediate frequency region for the case of single sideband transmission.
Figure 2C:
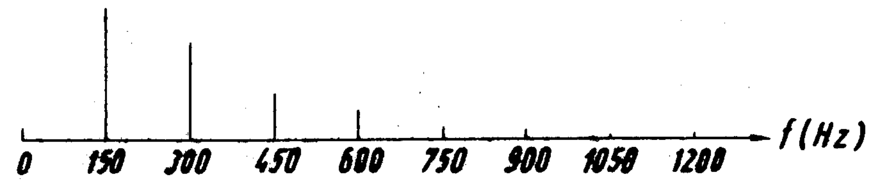
FIG. 2*c* is the frequency spectrum of the output of demodulator Q when said demodulator is a square law detector.

However, demodulator Q which in the embodiment here discussed is a square law detector, generates low frequency basic and harmonic oscillations as shown in the spectrum according to FIG. 2*c*.

Signals having the frequency spectrum furnished by the mixing stage M are fed to a phase discriminator P as are the signals furnished by demodulator Q having the frequency spectrum shown in FIG. 2*c*, after inversion by inverter stage U. The phase discriminator P generates an error signal as a function of the difference in frequency between the low frequency and reference signals, or the outputs of mixer M and demodulator Q respectively. This error signal serves to change the frequency of the oscillator O by changing the reactance of reactance stage R which in turn changes the oscillator frequency.

The oscillator O is synchronized with the corresponding transmitter carrier frequency oscillator when at least one of the low frequency signals furnished by mixer stage M coincides with at least one of the reference signals furnished by demodulator Q with respect to frequency.

The derivation of the error signal in phase discriminator P, through comparison of the reference signal and the low frequency signal, is possible mainly through use of the harmonics contained in speech. It would otherwise be very difficult since the low frequency signal and the reference signals are very different types. Of particular importance for this method are the vowels whose frequency spectrum consists quite strictly of a basic frequency and harmonics thereof. The amplitude of the individual harmonics are specifically distributed in accordance with so-called "Formant" regions.

In accordance with the method of the present invention, the frequency spectra of the vowels are used to generate the reference signals as a function of the difference in frequency between the harmonics. Thus these frequency differences between harmonics serve as a substitute for the carrier frequency which has been suppressed in the transmitter. These reference signals are preferably derived by means of square law detection without supplementary carrier frequency oscillations, and thus serve as reference signals whose frequency is independent of said supplementary carrier frequency generated in the receiver.

This synchronization method will be explained in more detail for a specific example, as follows:

It will be assumed that the transmitter broadcasts the frequency spectrum corresponding to the vowel U having a basic frequency of 150 Hz. The low frequency spectrum is shown in FIG. 2*a* of the drawing. This spectrum corresponds to the intermediate frequency spectrum shown in FIG. 2*b*. After square law detection by means of demodulator Q the low frequency spectrum shown in FIG. 2*c* is formed. Each component shown in FIG. 2*c* is formed from difference frequencies between harmonics and between harmonics and the basic frequency as follows:

| | |
|---|---|
| 1. 150 Hz. from | 300–150 Hz.<br>450–300 Hz.<br>600–450 Hz.<br>750–600 Hz.<br>900–750 Hz. |
| 2. 300 Hz. from | 450–150 Hz.<br>600–300 Hz.<br>750–450 Hz.<br>900–600 Hz. |
| 3. 450 Hz. from | 900–450 Hz. |

The frequency of 300 Hz. is particularly suitable as the frequency for the reference signal, since the intermediate frequency sideband oscillation of 30.15 kHz. corresponding to a modulation frequency of 150 Hz. is greatly attenuated by the single sideband filter. Furthermore the phase of the higher harmonics is likely to have unfavorable effects on the synchronization process, and the higher harmonics are therefore unsuitable for the formation of the reference frequency.

From the example it will be assumed that the frequency of the supplementary carrier frequency oscillator in the receiver is tuned manually to within +10 or −10 Hz. of the transmitter carrier frequency. In this case, for an intermediate frequency spectrum as shown in FIG. 2*b*, the mixer stage M will have an output of the following frequencies: 160, 310, 460, 610, 760 and 910 Hz.

The phase discriminator then serves to form the sum and difference frequencies of the above frequency spectrum and the frequency spectrum furnished by the modulator Q. If a low pass filter is inserted for filtering the output of the phase discriminator for suppressing all sum and difference frequencies of more than 20 Hz., then only the difference frequency of 310−300=10 Hz. can pass through this filter. The signal of this frequency then constitutes an error signal, or voltage, which is applied to the reactance stage R. Variations of reactance of the reactance stage R then result in oscillation of the frequency of the supplementary carrier frequency in rhythm with the different frequency of 10 Hz., that is, the supplementary carrier frequency is frequency modulated with a frequency variation of 10 Hz. This initiates a process characteristic for phase synchronization which result in the synchronization of the supplementary carrier frequency to the frequency of the suppressed carrier, that is 30 kHz. in the above example, if the frequency swing of the reactance stage R consists of at least 10 Hz. If the supplementary carrier frequency oscillator is synchronized with the transmitter carrier frequency oscillator, then the frequency of the low frequency signal furnished by the mixer stage M is no longer 310 Hz. but is 300 Hz. and therefore corresponds to the reference signal frequency supplied by demodulator Q. Thus the phase difference between the low frequency signal the reference signal is automatically reduced to a minimum and remains at said minimum. This phase difference may be minimized by fine tuning of the oscillator, so that a synchronization can be rapidly achieved even after long silence.

The fine tuning can be achieved either by hand under observation of a visual tuning indicator or automatically by means of a tuning motor controlled by the error signal.

It should be noted that the generation of the reference signal, namely the different frequency signals between a harmonic and the basic frequency, or between two harmonics, is best accomplished by a square law detector. Square law detection has the advantage that the different frequencies between the harmonics result in relatively larger amplitude components, while other demodulation products are attenuated.

However it is also possible to use linear detection. It is further possible to use a frequency demodulator arranged as a phase demodulator for the demodulator Q since the mutual phase modulation of the single sideband frequencies corresponds to a frequency modulation, whose frequency variation is proportional to the product of the phase variation and the difference frequency.

In a practical embodiment of the method of this invention, it is further advantageous to filter the intermediate frequency oscillations corresponding to the lower harmonics of the modulation signal by means of a band pass filter after the transformation to the intermediate frequency has taken place. Thus only a limited frequency spectrum is applied to the demodulator and the mixer stage. It should further be noted that the synchronization method according to this invention which is based on use of the harmonics present in the overtones of spoken sounds is also applicable for the transmission of pure sine tones. In this case the harmonics necessary for the generation of the reference signals are generated by nonlinear distortion which is present in almost every transmitter, and especially in transmitters used for the transmission of speech which have a relatively high distortion factor.

While the invention has been illustrated and described as embodied in a receiver for reception of suppressed carrier single sideband signals, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

I claim:

1. Method for synchronizing a supplementary carrier frequency oscillator in a receiver with the corresponding transmitter carrier frequency oscillator used during the generation of a transmission signal having at least a single sideband of said carrier frequency with a modulation signal having a fundamental frequency and harmonics of said fundamental frequency, comprising in combination, the steps of receiving said transmission signal thus furnishing a received signal; heterodyning said received signal, thus generating an intermediate frequency signal; filtering said intermediate frequency signal thereby creating a filtered signal in which intermediate frequencies corresponding to higher harmonics in said modulation signal are suppressed; square law demodulating said filtered signal in such a manner that at least one reference signal having a frequency corresponding to the difference in frequency between at least one pair of frequencies in said modulation signal is generated; mixing said received signal with said receiver generated supplementary carrier frequency signal, thus furnishing a low frequency signal; comparing said reference signal and said low frequency signal and generating an error signal as a function of any difference between their respective frequencies; and changing the frequency of said receiver supplementary carrier frequency oscillator as a function of said error signal.

2. An arrangement for synchronizing a supplementary carrier frequency oscillator in a receiver with the corresponding transmitter carrier frequency oscillator used during the generation of a transmission signal comprising at least a single sideband of said carrier frequency with a modulation signal having a fundamental frequency and harmonics of said fundamental frequency, comprising in combination, receiving means for receiving said transmission signal thus generating a received signal; heterodyning means connected to said receiving means for generating an intermediate frequency signal corresponding to said received signal; isolation amplifier means connected to the output of said heterodyning means; filter means for suppressing intermediate frequencies corresponding to higher harmonics in said modulation signal, connected to the output of said isolation amplifier means; square law detector means connected to the output of said filter means for furnishing a reference signal having a frequency corresponding to the difference in frequency between a pair of frequencies in said modulation signal; mixing means for mixing said received signal with said receiver generated supplementary carrier frequency signal, thus furnishing a low frequency signal; means for comparing said reference signal and said low frequency signal and generating an error signal as a function of any difference between their respective frequencies; and means for changing the frequency of said receiver supplementary carrier frequency oscillator as a function of said error signal.

3. An arrangement as set forth in claim 2 wherein said means for comparing said reference signal and said low frequency signal comprise phase discriminator means; also comprising inverter means for inverting said reference signal prior to application to said phase discriminator means.

4. An arrangement as set forth in claim 3 also comprising low pass filter means connected between said phase discriminator means and said means for changing the frequency of said receiver supplementary carrier frequency oscillator as a function of said error signal.

5. An arrangement as set forth in claim 4 wherein said low pass filter has a band width of less than 20 Hz.

6. An arrangement as set forth in claim 2 wherein said means for adjusting the frequency of said receiver supplementary carrier frequency oscillator comprise a variable reactance stage, having a reactance which varies as a function of said error voltage, and connected to said receiver supplementary carrier frequency oscillator in such a manner that the frequency of said supplementary carrier frequency oscillator varies as a function of said reactance of said reactance stage.